H. H. SUTRO.
DRAINAGE SYSTEM.
APPLICATION FILED JAN. 15, 1907.
994,617.
Patented June 6, 1911.
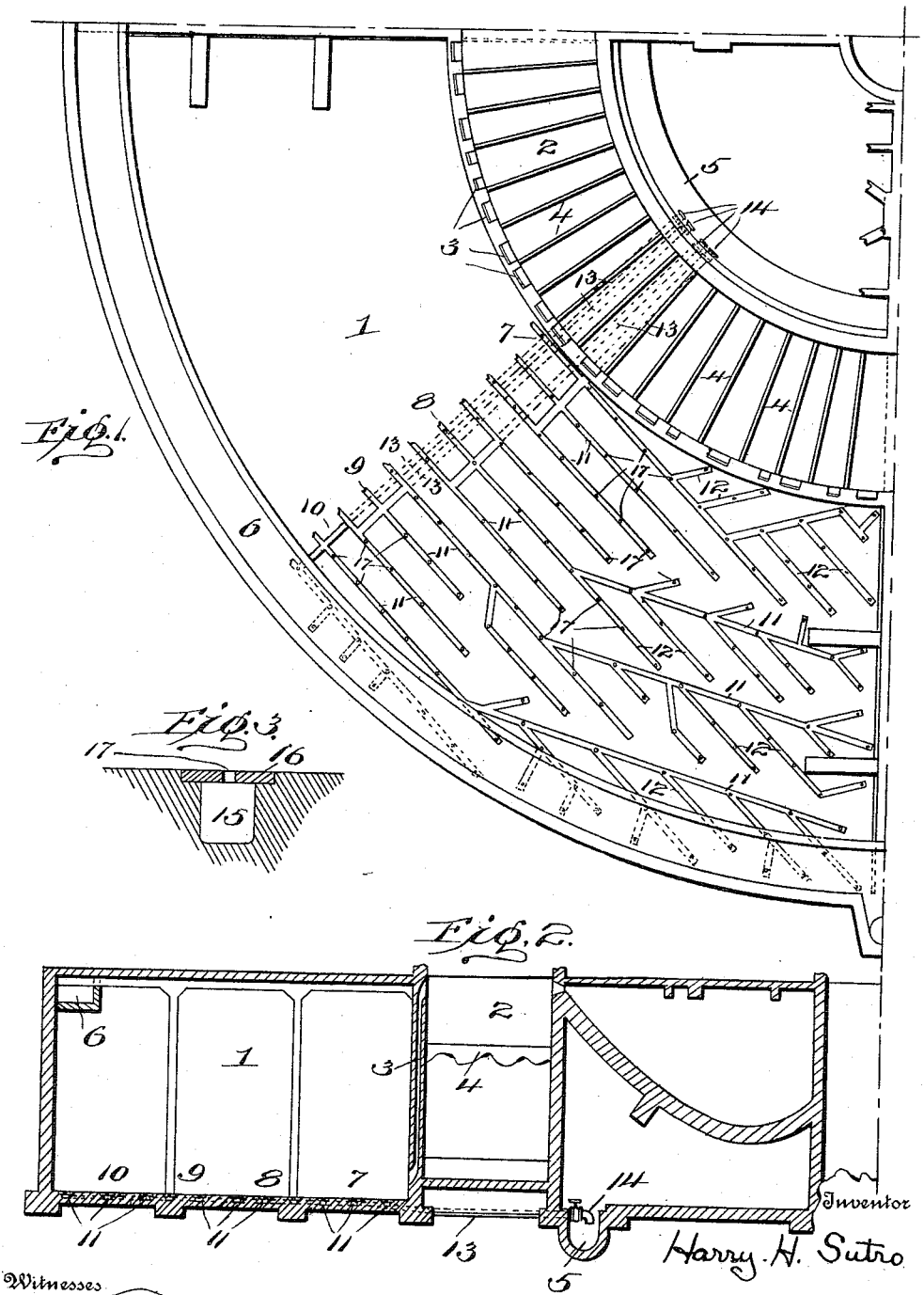

UNITED STATES PATENT OFFICE.

HARRY H. SUTRO, OF NEW YORK, N. Y.

DRAINAGE SYSTEM.

994,617.  Specification of Letters Patent.  Patented June 6, 1911.

Application filed January 15, 1907. Serial No. 352,474.

*To all whom it may concern:*

Be it known that I, HARRY H. SUTRO, a citizen of the United States, residing at New York, in the county of New York and State of New York, have invented certain new and useful Improvements in Drainage Systems; and I do hereby declare the following to be a full, clear, and exact description of the invention, such as will enable others skilled in the art to which it appertains to make and use the same.

The present invention relates to an improved drainage or sludge disposal system which is especially adapted for use in connection with settling basins or other tanks in which precipitation or sedimentation is apt to occur, the object of the invention being to accomplish any or all of the following desirable results:—To render readily preventable any great accumulation of precipitates or sediments in the basins or tanks; to permit the removal of such precipitates or sediments when desired without first emptying such basins or tanks of liquid; and to allow such removal with economy in the amount of flushing liquid required.

To this end the invention consists essentially in arranging the drain openings in a series of independent systems connected by curved or branched drains and each of which systems can be put into and out of operation when desired.

With these and other objects in view, the invention comprises certain novel constructions, combinations and arrangements of parts as will be hereinafter more fully described and claimed.

In the accompanying drawings:—Figure 1 is a top plan view of a settling basin in the shape of a sector or annular sector, provided with my improved drainage system. Fig. 2 is a transverse, vertical, sectional view through the same. Fig. 3 is an enlarged sectional view through one of the drains.

The invention may be employed in connection with any kind of liquid handling plant, such as the water treating plant shown in the accompanying drawings in which the numeral 1 designates a settling basin, and 2 a mixing chamber wherein the water can be treated with a coagulant or other chemical as desired, and from which the water is discharged into the settling basin. This discharge is shown as taking place through a series of openings 3 formed in the dividing wall between the settling basin and the mixing chamber and communicating at their lower ends, with the former and at their upper ends with the latter. If found desirable the mixing chamber 2 may be provided with a series of baffle plates 4, although this constitutes no part of the present invention. A gutter or sewer 5 of any suitable type is shown as arranged along one of the outer sides of the mixing chamber 2, and this sewer receives the discharge from the system of underdrains located within the settling basin 1.

Any suitable means may be employed for withdrawing the settled water from the settling basin 1, and in the present instance this result is accomplished through the medium of a trough 6 into which the settling basin overflows. In the particular construction shown, the drain openings are arranged in a series of successive zones 7, 8, 9 and 10 extending transversely across the path of the water as it flows from the inlets 3 of the settling basin to the outer trough 6. Each of the zones 7, 8, 9 and 10 comprises a series of mains 11 which may be disposed in a zigzag manner as shown in the drawings and receive the discharge from a series of laterals or branches 12. It is, of course, evident that a single drain following a curved or broken or mixed line or other shape could be used to connect the drain openings in each zone without departing from the principle of this invention although such is not the preferred construction. Communication between the various zones and the sewer 5 is brought about by means of the discharge pipes 13 which in the present instance extend under the mixing chamber 2 and are provided with valves 14 by means of which the various zones can be controlled independently of each other. In the specific construction of the drains it will be observed that the same are shown as being constituted by troughs or channels 15 covered by a slab 16 perforated as at 17 although it is within the province of the invention to employ any approved form of drain.

In settling basins where the liquid passes from one side of the basin to the opposite side, the deposit of sediment is not uniform over the bottom of the basin, and the deposit is generally thicker toward the inlet side.

The operation of the improvement, as applied to the case illustrated, is as follows:— Assuming that the basin 1 is full of liquid and that as much sediment as appears desirable has accumulated on the bottom thereof, this sediment will, on the average, lie deeper over the zone 7 than over the zone 8, deeper over the zone 8 than over the zone 9, and deeper over the zone 9 than over the zone 10. When the drain valve 14 controlling the zone 7 is opened, the head of liquid in the basin 1 forces out the greater part of the precipitate covering this zone through the perforations 17. It is readily seen that the deeper the accumulation of sediment, the longer the period during which the drain valve 14 must be kept opened to allow such sediment to escape, while as soon as clear liquid appears at the valve 14, this is an indication that as much sediment has been flushed out as practicable and that the valve should be closed. Assuming, as shown in Fig. 1, that the zones 7, 8, 9 and 10 cover mutually equal bottom areas in the basin 1 and have approximately equally numerous perforations of like size, uniformly distributed, it is evident that with a depth of sediment over the zones 7, 8, 9 and 10, which is least over the zone 10 and greatest over the zone 7, their respective control valves 14 must be kept open for different lengths of time to effect equally thorough discharge of sludge. Were the four zones all controlled by a single valve, the perforations in zone 10 would have begun to discharge clear liquid some time before the discharge of sediment from the perforations in zone 7 had ceased, and thus a considerable volume of clear liquid would be discharged from the tank 1 unnecessarily. This is avoided by the construction shown.

While in the preferred construction, which is shown in the accompanying illustration, each sludge opening, except where the edges of the basin prevent, is approximately equi-distant from six other openings similar in size and shape, I do not limit myself to this particular pattern, nor as to the size nor the shape of drain openings. I may say however that it is desirable that the valve controlling the discharge from each set of drain openings should not be less in area than the sum of the areas of the drain openings which it serves. I do not limit myself to the particular shape of settling basin shown in Fig. 1.

Having thus fully described my invention, what I claim as new and desire to secure by Letters Patent is:—

1. A series of independent drainage systems arranged in successive zones, each system comprising a number of mains arranged in a zigzag manner.

2. The combination of a basin, and a series of independent drainage systems arranged in successive zones within the basin, each zone comprising a number of mains having a zigzag arrangement.

3. The combination of a basin, and a series of independent drainage systems arranged in successive zones within the basin, each drainage system comprising mains and laterals.

4. The combination of a basin, and a series of independent drainage systems arranged in successive zones within the basin, each drainage system comprising a number of mains having zigzag arrangement, and laterals discharging into the mains.

5. The combination with a settling basin, inclosing a well, of a plurality of drainage systems discharging into the well, each of said systems comprising a plurality of ducts and means for controlling the discharge from such drainage systems.

6. A basin constructed as an annular sector, a plurality of drainage systems located in the basin, each system comprising a plurality of ducts, and an independent duct communicating with each independent system and terminating within the annulus.

7. A basin constructed in the form of an annular sector, a plurality of drainage systems disposed in the bottom of the basin, each system comprising a plurality of ducts draining an independent area, a duct leading from each of the independent systems and discharging within the annulus and means for controlling the discharge.

8. A basin provided with a plurality of drainage systems in the bottom, each of said systems comprising a plurality of ducts and draining independent areas and a duct communicating with each system and discharging into a collector within the basin, and means for controlling the discharge.

In testimony whereof I affix my signature in presence of two witnesses.

HARRY H. SUTRO.

Witnesses:
 HUGO MOCK,
 L. W. BOOTH.

Copies of this patent may be obtained for five cents each, by addressing the "Commissioner of Patents, Washington, D. C."